Aug. 27, 1935.     H. HUEBER ET AL     2,012,818
REMOTE CONTROL FOR AIR HORNS
Filed March 19, 1931

Inventors
Henry Hueber
Erwin C. Horton
By Bean Brooks & Henry
Attorney

Patented Aug. 27, 1935

2,012,818

UNITED STATES PATENT OFFICE 2,012,818

REMOTE CONTROL FOR AIR HORNS

Henry Hueber, Buffalo, and Erwin C. Horton, Hamburg, N. Y., assignors to Trico Products Corporation, Buffalo, N. Y.

Application March 19, 1931, Serial No. 523,888

7 Claims. (Cl. 137—139)

The present invention relates to a remote control for fluid pressure operated horns, and particularly to a means by which such a horn, mounted upon a vehicle for emitting warning signals, may be electrically controlled by an electrical control button in the driver's compartment of the vehicle.

The invention further relates to an improved fluid pressure-electro control unit of unitary form which may be inexpensively constructed and applied to a horn system. The improvements of this unit which enable the device to be economically constructed and applied and which render it efficient in operation will be fully set forth along with other objects and advantages in the following description of one typical embodiment of the invention, reference being made to the accompanying drawing, wherein:—

Figure 1:
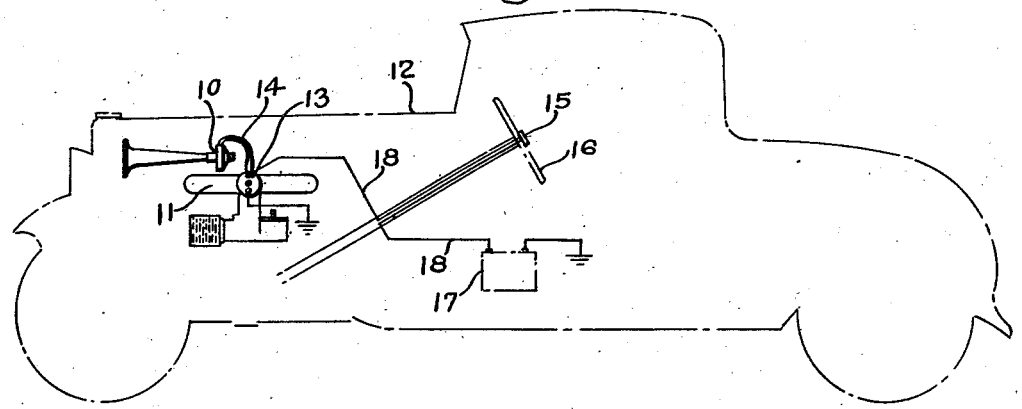
Fig. 1 is a diagrammatic side elevation of a motor vehicle showing a horn and a remote control therefor installed upon the vehicle.
Figure 2:
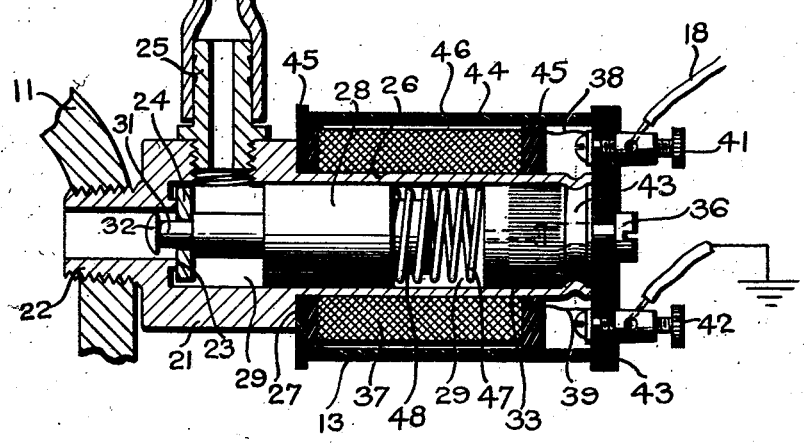
Fig. 2 is an enlarged vertical section, taken through the horn control unit in a plane at right angles to that of Fig. 1.

As shown in Figs. 1 and 2, a fluid pressure operated horn 10, which may be of the type disclosed in our Patent No. 1,810,478 issued June 16, 1931, or of other type, is connected to the intake manifold 11 of the internal combustion engine powering the vehicle 12, in such manner that suction maintaining in the manifold may be effective to draw an actuating stream of air through the horn. An electro-suction control unit, indicated generally at 13, is connected to the manifold 11 and to a section line 14 leading to the horn. The control unit is arranged in an electrical circuit comprising an electrical control button 15, which may be mounted upon the vehicle steering wheel 16 or elsewhere about the vehicle body, a battery 17 or other source of electrical energy, and electrical lead wires 18, so that the driver of the vehicle may by pressing or ceasing to press the control button 15, open or close the suction passage through the unit 13, to control the horn 10.

The electro-suction control unit comprises a hollow body portion 21, preferably formed of brass, which may have a threaded nipple portion 22 for attachment to the manifold 11 or an extension thereof. The inner end of the nipple portion has an annular seat 23 for seating a valve 24 disposed in the hollow of the body. A nipple 25, adapted to attach the suction line 14, which preferably comprises a flexible tube, is threaded into the body 21 to provide for communication between the suction line and the interior of the body. The latter has a tubular extension 26, the walls of which may be of less thickness than those of the body proper, providing an annular shoulder 27.

An armature 28 is slidably received in the bore 29 which comprises the interior of the body 21 and the extension 26, and has an extended portion with a neck 31 of reduced diameter. The latter slidably receives the valve 24, being of greater length than the thickness of the valve and having an enlarged head 32 for preventing displacement of the valve.

Figure 3:
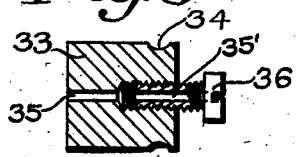
Fig. 3 is a detail sectional view of a portion of the device depicted in Fig. 2.

A fluted plug 33, having an annular groove or recess 34 about its outer end, is forced into the open end of the tubular extension and the walls of the latter are crimped or otherwise depressed into the recess 34 to retain the plug against longitudinal displacement, the flutes holding it against rotation relative to the body or extension 26. As shown in Figs. 2 and 3 a vent 35 is formed through the plug, a headed screw 36 having a vent 35' being threaded into the outer end of the plug.

A solenoid winding 37 encircles the extension 26 for actuating the armature 28, the solenoid having a pair of terminal wires 38, 39 connected to binding posts 41 and 42 respectively. The latter are mounted upon an insulated plate 43 which is held fixed against the end of the extension 26 by the headed screw 36. In order to prevent water or metallic parts from contacting the coil 37 an insulating and waterproof coil housing 44, comprising annular members 45 and a tubular member 46, is disposed about the solenoid winding, being held in assembled relation between the insulated plate 43 and the shoulder 27.

The tension spring 47 is disposed between the plug 33 and the armature 28 for normally holding the latter in the position shown in Fig. 2 in which the valve 24 is held against the annular seat 33. The armature, or the plug if desired, may have a centering extension 48 for retaining the spring co-axial with the bore 29 of the body and extension.

In operation, suction maintaining in the manifold 11 will, normally, not be effective to actuate the horn since the valve 24 will be held against its seat 33 by the suction and by the spring 47 so that no communication is provided between the manifold and suction line 14. The operator of the vehicle may sound the horn by depressing the horn button 15, thereby closing the circuit which includes the source of electrical energy 17, the leads 18, the solenoid winding 37, and the return, which may be a grounded connection as illustrated. Electrical energy passing through the solenoid will be effective to draw the armature 28 away from the valve seat 23, compressing the spring 47. The valve 24 will be held seated by the pressure of atmospheric air in the bore 29 acting against its inner face, less than atmospheric pressure maintaining against its outer face. Because of the play connection between the valve and the armature, the latter will be permitted to gain sufficient momentum by the time the head 32 contacts the valve to overcome the valve opening resistance of the atmospheric air and will unseat the valve. While the horn button 15 remains depressed the valve will be held in unseated position allowing atmospheric air to flow from the horn through the line 14 and control unit 13 into the manifold 11. Upon releasing of the horn button the electrical circuit will be opened and the spring 47 will immediately move the valve to its seat, the position shown in Fig. 2.

It will be understood that in constructing the control unit the armature assembly including the armature 28, the valve 24, and the spring 47 may be inserted into the bore of the unitary body 21 and extension 26; that the plug 33 may then be inserted in the extension and the latter crimped into the plug groove 34 by a simple and inexpensive deforming operation. The solenoid winding and the insulated housing 44 therefor may be applied to the extension portion and secured in place by the plate 43 upon threading the headed screw 36 into the plug. The device is rendered certain and economical in operation since the plug connection between the valve and armature utilizes the momentum of the latter to overcome the opening resistance of the valve and since the vent opening 35, 35' prevents loss of energy which might occur through compression of air between the armature and plug. The control unit thus provides a simple, inexpensive and efficient means of controlling the fluid pressure operated horn 10 from the conventional electric horn button or circuit breaker.

It will also be understood that in the event the valve 24 is improperly seated, or for other reasons, leakage thereby occurs when the valve is closed, small quantities of air may bleed into chamber 29, between the valve 24 and the fluid inlet tube 14, from atmospheric vent 35, 35' and past armature 28, to prevent suction from building up in the tube 14, which suction may cause "whining" or partial operation of the horn.

It will further be understood that the structure described and illustrated herein relates to only one embodiment of the principles of the invention and that these principles may be applied to other devices.

What is claimed is:

1. A fluid pressure-electro control unit comprising a hollow body having a tubular extension, said body having a fluid passage terminating in a valve seat, said body having another fluid passage terminating in the interior thereof, one of said passages being for connection to an intake manifold and the other of said passages being for connection to a suction operated accessory, a valve disposed in said body for closing against said valve seat, an armature slidable in said extension supporting and having a play connection with said valve, a vented plug in the open end of said tubular extension, the walls of the latter being crimped about said plug, spring means between said plug and armature for moving the latter to seat the valve, a solenoid winding about said extension, an insulated housing disposed about said winding, and fastening means securing the housing to said plug.

2. A fluid pressure-electro control unit comprising a unitary body having an integral tubular extension, said body having a fluid passage therethrough, a valve in said body for opening and closing said fluid passage, an armature having a play connection with the valve and slidably mounted in the bore of said extension, a plug fitted into the end of said tubular extension, said plug having an annular recess and a central vent, the walls of the extension being depressed into said recess, spring means disposed between the plug and armature for urging the latter to valve closing position, and a solenoid winding about said extension for moving the armature to valve opening position.

3. A fluid pressure-electro control unit comprising a unitary body having an integral tubular extension, said body having a fluid passage therethrough, a valve in said body for opening and closing said fluid passage, an armature having a play connection with the valve and slidably mounted in the bore of said extension, a plug having a fluted peripheral portion fitted into the end of the tubular extension, the walls of the extension being crimped about the plug, a solenoid winding and a housing therefor disposed about said extension, a plate for retaining the winding and housing, spring means between the plug and armature, and a screw fastener connecting the plate to the plug, said plug and screw fastener having a vent therethrough for allowing open communication between the outside atmosphere and the space between the armature and plug.

4. A fluid pressure-electro control unit comprising a unitary body having an integral tubular extension, said body having a fluid passage therethrough, a valve and operating armature therefor disposed within the body and extension for opening and closing said fluid passage, a plug having a fluted peripheral portion fitted into the end of the tubular extension, the walls of the latter being depressed about the plug to retain it against displacement, a solenoid winding and an insulating covering therefor disposed about said extension, a plate for retaining the winding and covering, and a screw fastener connecting the plate to the plug.

5. A fluid pressure-electro control unit for mounting in the suction line between a suction operated horn and a source of suction, comprising a hollow casing having a fluid inlet port and a suction port, a valve seat about the suction port, a valve for the seat and normally urged toward said seat by the influence of suction in the suction port, electromagnetic means for unseating the valve, and said casing having an atmospheric vent for bleeding atmospheric air into the casing interior between the valve and the fluid inlet port, for compensating for leakage of fluid past said valve when seated.

6. A fluid pressure control unit for being interposed in the suction line between a suction operated horn and a source of suction, comprising a hollow casing having a fluid inlet port and a suction port, valve means in the casing for closing or opening fluid communication between said ports, and said casing having an atmospheric vent for bleeding atmospheric air into the casing interior between the valve and the fluid inlet port.

7. In a fluid pressure apparatus including a suction operated horn, a source of suction, and a suction conduit connecting said horn and source; valve means in the suction conduit for opening and closing said conduit for fluid passage to effect or discontinue operation of the horn, and said conduit having an atmospheric bleed vent between the valve means and horn, whereby air will be drawn through the vent to the source of suction without operating said horn when the valve means are closed and leakage thereby occurs.

HENRY HUEBER.
ERWIN C. HORTON.